United States Patent [19]
Burton et al.

[11] 3,719,116
[45] March 6, 1973

[54] UNDERWATER SAW FOR TREE AND STUMP REMOVAL

[76] Inventors: Cyril Burton, Sunrise Valley Trailer Park; Douglas Steeves, 1908-12th Ave., both of Prince George, British Columbia, Canada

[22] Filed: Sept. 22, 1971

[21] Appl. No.: 182,612

[52] U.S. Cl.................83/483, 114/16 R, 61/69 R, 83/926, 83/928, 30/379
[51] Int. Cl...........................B27b 5/02, B63c 11/48
[58] Field of Search.........143/34; 114/16 R; 61/69 R

[56] References Cited

UNITED STATES PATENTS

| | | | |
|---|---|---|---|
| 1,221,401 | 4/1917 | Wilhelm et al. | 143/34 |
| 1,946,390 | 2/1934 | Christiansen | 143/34 |
| 2,981,073 | 4/1961 | Robinson | 61/69 R |
| 3,434,443 | 3/1969 | Estabrook | 114/16 R |

*Primary Examiner*—Donald R. Schran
*Attorney*—Kent & Ade

[57] ABSTRACT

An underwater component is connected to a surface vessel by means of a flexible umbilical connection which includes an anchor cable, hydraulic lines, control lines, and television and light connections. The component includes hydraulically operated propellers for controlling the attitude and position of the component, a television camera and light source for viewing the underwater scene from the surface vessel and a pair of saw blades rotating in a horizontal plane by hydraulic motors to cut off trees and stumps under water.

16 Claims, 5 Drawing Figures

UNDERWATER SAW FOR TREE AND STUMP REMOVAL

BACKGROUND OF THE INVENTION

In the general flooding of land by hydro-electric dams, vast lakes are created which may then be used for recreation and/or commercial purposes.

Under certain circumstances, it is feasible to log the land prior to submergence by water but in many instances this is not feasible. In any event, it is quite usual for many trees and stumps to be left prior to flooding and these trees and stumps whether the land has been logged generally or not, often create hazards to navigation and interfere with sport or commercial fishing. Furthermore the top growth of such lumber fouls and pollutes the water over a period of several years while it is deteriorating.

SUMMARY OF THE INVENTION

The present invention relates to a device which is connected to a surface vessel by means of an umbilical tube and is controlled from the surface vessel and actuated to cut off trees and stumps substantially at ground level so that the severed tree and stump may float to the surface whereupon it may be recovered and removed from the water. The lumber may either be destroyed or, if in sufficient quantities and in the desired location, can be salvaged for commercial use.

The principal object and essence of the invention is therefore to provide a device of the character herewithin described which enables submerged trees and stumps to be severed relatively close to the lake bottom controlled by a surface vessel.

Another object of the invention is to provide a device of the character herewithin described which includes a light source and television camera so that the cutting operation can be viewed from the surface vessel. This in conjunction with means to control the attitude and position of the device, enables a thorough cleanup of the lake bottom to be accomplished with the minimum of difficulty.

A yet further object of the invention is to provide a device of the character herewithin described which enables lumber to be salvaged for commercial purposes after it has become submerged. In many instances it will be appreciated that it is not possible to remove lumber prior to the formation of a lake due to the difficulty of access and the like.

A yet further object of the invention is to provide a device of the character herewithin described which is relatively simple in construction, economical in manufacture and otherwise well suited to the purpose for which it is designed.

With the considerations and inventive objects herein set forth in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept.

DESCRIPTION OF THE DRAWINGS

In the drawings like characters of reference indicate corresponding parts in the different figures.

PRELIMINARY DESCRIPTION

Figure 1:
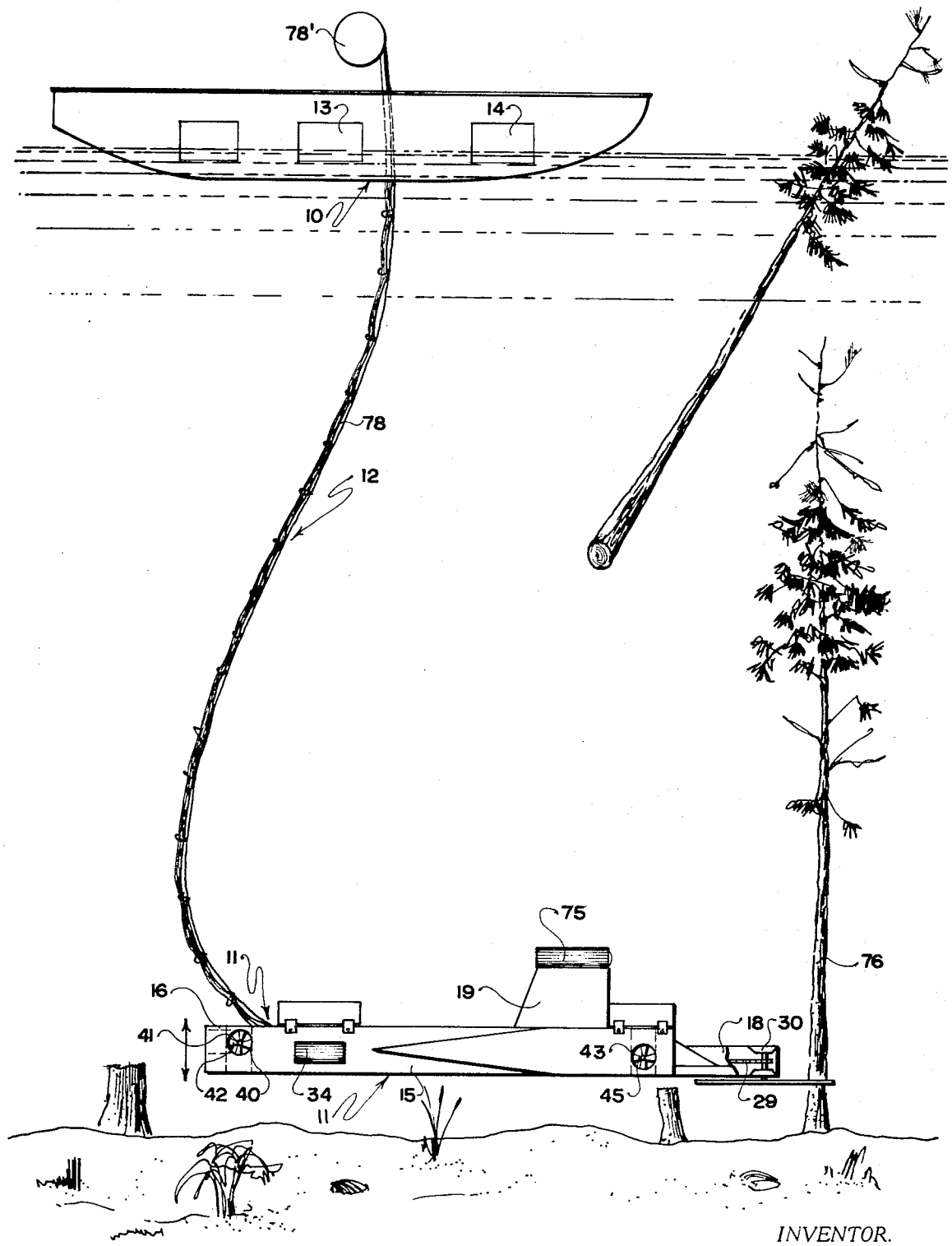
FIG. 1 is a side elevation of the system in use.

Reference to FIG. 1 will show a surface vessel collectively designated 10 and a satelite component collectively designated 11 connected together by means of a flexible umbilical connection collectively designated 12.

Reference character 13 illustrates schematically, a source of fluid pressure and reference character 14 illustrates schematically a source of electrical energy both of which are in the surface vessel 10.

The surface vessel 10 is of course shown schematically but will include a conventional source of power, propeller means, steering means and general navigation and other conventional equipment.

DETAILED DESCRIPTION

Figure 2:
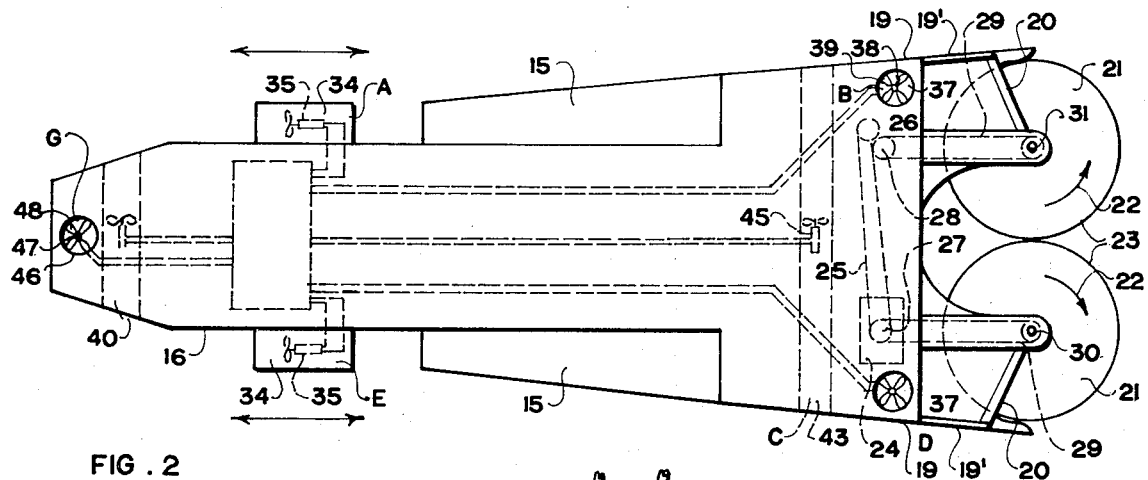
FIG. 2 is a top plan view of the satelite component per se.

Proceeding therefore to describe the invention in detail, the satelite component 12 consists generally of a framework 15 substantially rectangular in shape when viewed in plan but tapering towards the rear end 16 as shown in FIG. 2.

One or more floation tanks 17 are mounted upon the satelite component 11 in order to provide basically neutral buoyancy to the assembly.

A pair of members 18 extend forwardly from the front end 19 of the framework 15 in spaced and parallel relationship and outboard of each of these, guide members 19' extend as clearly shown, being braced to members 18 by means of braces 20.

Journalled for rotation in each of the members 18, is a relatively large diameter saw blade 21, said saw blades being mounted in side by side relationship for rotation in a common horizontal plane.

The blades 21 rotate in opposite directions as indicated by arrows 22 so that the front portions 23 of the blades rotate away from one another, the purpose of which will hereinafter become apparent.

Means are provided to rotate the saw blades at the desired speed of rotation and takes the form of a fluid operated motor shown schematically by reference character 24. One such motor may be provided, or if desired, a separate motor for each blade but in the present embodiment illustrated, one motor is utilized. This motor drives a sprocket (not illustrated) around which a main drive chain 25 extends, said drive chain passing around an idler sprocket 26 as clearly shown in FIG. 2. The sprocket not illustrated and rotated by the drive motor 24, also rotates sprocket 27 and the main drive chain 25 rotates a further sprocket 28. Secondary drive chains 29 extend around sprockets 27 and 28 and around sprockets 30 and 31 respectively which are connected to the drive shaft (not illustrated) mounting the saw blades 21 to the members 18, it being understood that the sprockets 31 and chains 29 are also enclosed within members 18.

The routing of the drive chain 25 around the idler sprocket 26 ensures the contra rotation of the saw blades in the direction of arrows 22 as hereinbefore described.

The fluid operated motor 24 is connected via fluid pressure conduits 32 and 33 forming part of the umbilical means 12 and connecting to the source of fluid pressure 13 within the surface vessel 10. This source of fluid pressure may either be air or hydraulic fluid and is preferable that it be hydraulic fluid but this application is not limited to the use of hydraulic fluid only.

Suitable controls (not illustrated) are situated within the surface vessel for controlling the rotation of the saw blades 23 in the manner hereinbefore described.

The position and attitude of the satelite component 11 is controlled by a plurality of propellers each individually operated by a fluid operated motor as will hereinafter be described.

A tubular casing 34 is situated upon each side of the framework 15 and carries therewithin a propeller 35 operated by a fluid motor 36, designated in at least one of the claims as the first fluid motor. The propellers 35 are adapted to rotate in a vertical plane and control the forward and rearward motion of the component depending upon the direction of rotation of the propellers 35 as will hereinafter be described.

Vertical open ended tubes 37 are situated through the framework adjacent the front end 19 thereof and fourth fluid motor 38 operate propellers 39 situated in a horizontal plane within each of these tubes and rotation of these propellers 39 in one direction or the other, controls the vertical movement of the front end 19 of the component.

A horizontal open ended tube 40 is situated at the rear of the framework and a second fluid motor 41 rotates a propeller 42 in a vertical plane but at right angles to propellers 35 and rotation of this propeller in one direction or the other controls the sideways movement of the rear end 16 of the component.

A similar open ended tube 43 extends through the framework adjacent the front end 19 thereof and this contains a fluid motor 44 driving a propeller 45 in a similar plane to propeller 42 thus controlling the sideways movement of the front end 19 of the component.

Finally an open ended tube 46 is situated vertically through the framework adjacent the rear end 16 containing a fluid motor 47 rotating a propeller 48 in a horizontal plane and rotation of this propeller in one direction or the other controls the vertical movement of the rear end 16 of the component.

It will therefore be appreciated that the motor and propeller combination hereinbefore described, give complete control over the attitude and position of the component within limits, relative to the surface vessel 10.

Figure 4:
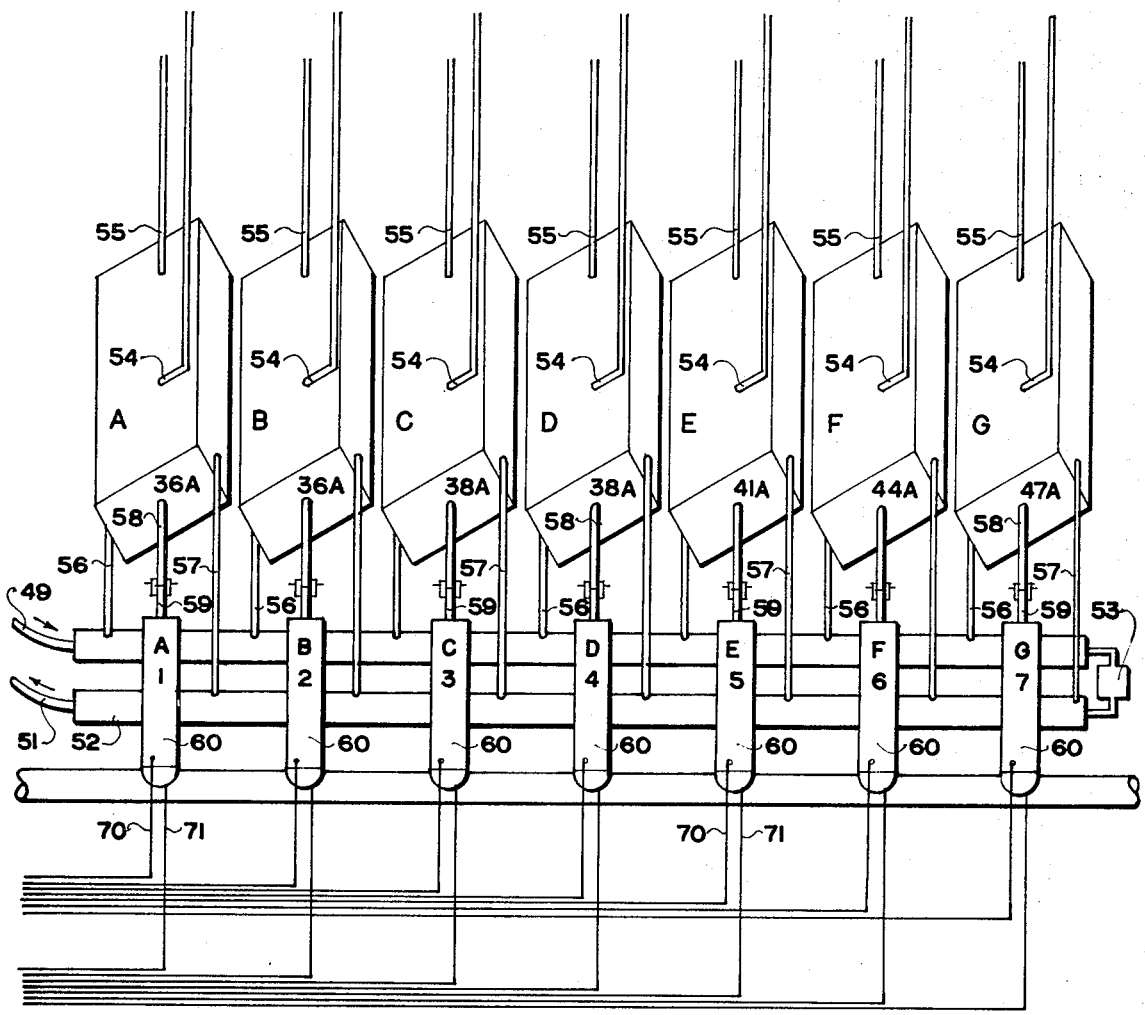
FIG. 4 is a partially schematic view showing the control shuttle valves and associated circuitry.

The attitude control of fluid motors 36, 38, 41, 44 and 47 are controlled from the surface vessel via the umbilical means 12 as will now be described, particular reference being had to FIGS. 3, 4 and 5.

Figure 3:
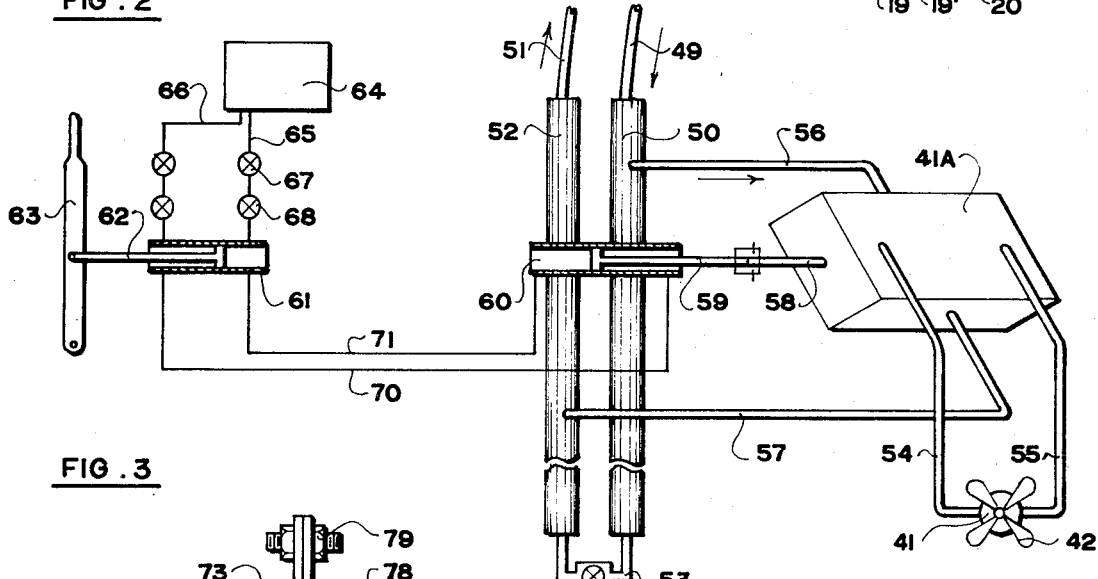
FIG. 3 is a schematic view showing the method of controlling one of the propellers, on the component, from the surface vessel.

A main fluid pressure conduit 49 extends from the source of fluid pressure 13 on the surface vessel, down through the umbilical means 12, to a common pressure manifold 50 situated on the component 11 and shown in FIG. 3.

A return common fluid conduit 51 also extends from the surface vessel, down through the umbilical means 12, to a return manifold 52 also shown in FIG. 3 and the distal ends of manifolds 50 and 52 are connected by means of a pressure relief valve 53 as shown.

Each attitude fluid motor is provided with a shuttle valve 36A, 38A, 41A, 44A and 47A, it being understood that there are two shuttle valves 36A, and two shuttle valves 38A inasmuch as these fluid motors are in pairs.

Fluid lines 54 and 55 extend between each shuttle valve and each fluid motor as shown in FIG. 3 and further fluid lines 56 and 57 extend between the manifolds 50 and 52 and each shuttle valve, fluid line 56 extending from the pressure manifold 50 to the shuttle valves and fluid line 57 extending from the shuttle valves to the return line 52 as clearly shown in FIG. 3.

The shuttle valves are conventional in construction and can be moved to connect either pressure line 56 with line 54 or 55, the other line of course being automatically connected to the return line 57 thus causing the fluid motor to rotate either in one direction or the other.

The shuttle valves also include a neutral position under which circumstances of course, the motors are stationary.

Each shuttle valve is connected by linkage 58 to a piston rod 59 forming part of a slave piston and cylinder assembly 60 it being understood that there is one slave piston and cylinder assembly for each shuttle valve.

On the surface vessel 10, a master piston and cylinder assembly 61 is located with the piston rod 62 being connected to a manually operated lever 63.

A reservoir 64 contains hydraulic fluid with lines or conduits 65 and 66 extending via shut off valves 67 and check valves 68, to each end of the master cylinder 69 thus ensuring that the cylinder is full at all times. A closed hydraulic conduit 70 extends from one end of the master cylinder 69 to one end of the slave cylinder 60 and a further conduit 71 extends from the other end of cylinder 69 to the other end of cylinder 60, said conduits forming a closed circuit master and slave assembly. This means that if lever 63 is moved, the piston of the master piston and cylinder assembly 61 automatically operates the piston of the slave piston and cylinder assembly 60 in the same direction and by the same amount so that linkage 58 will actuate the shuttle valves to cause the motors to rotate either in one direction or the other or to remain stationary.

It should be appreciated that there is a master and slave assembly together with an individual lever for each of the attitude motors 36, 38, 41, 44 and 47 so that individual propellers can be rotated in either direction to adjust the attitude and position of the component 11.

Figure 5:
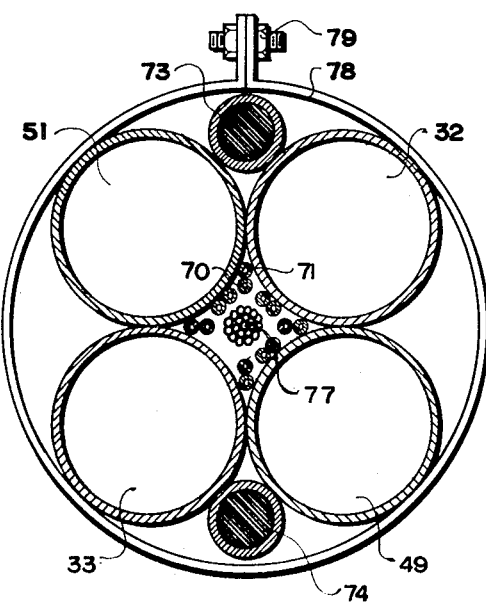
FIG. 5 is an enlarged cross sectional view of the umbilical connection.

An electrical cable extends from the electrical source 14, through the umbilical means 12, to a source of illumination 72 carried by the satelite component 11 and this cable 73 is shown in FIG. 5.

A further electrical cable 74 also extends through the umbilical means 12 and connects a closed circuit television camera assembly 75 to a viewing screen (not illustrated) on the surface vessel but as such closed television assemblies are conventional, it is not believed necessary to describe same further. Suffice to say that the combination of the light 72 and the television camera 75 enables the operator in the surface vessel to view the location and exact position of the satelite component 11 and to guide same via the attitude motors hereinbefore described so that a tree or stump illustrated schematically by reference character 76, can be engaged between the two saw blades 21 carried on the front end of the component. The contra rotation in an outward direction of the saw blades draws the component into the exact central position relative to the tree or stump so that both blades engage the tree or stump and sever same so that it floats to the surface as shown schematically in FIG. 1.

FIG. 5 shows the umbilical means 12 which includes an anchor cable 77 extending between the surface vessel 10 and the satelite component 11 and connected to a winch 78' shown schematically in FIG. 1. The fluid pressure conduits 32, 33, 49 and 51 are shown together with the light cable 73 and the television cable 74, and the plurality of pairs of closed hydraulic lines 70 and 71. In the present embodiment there are seven such pairs of closed conduits, one for each attitude motor assembly.

All of these conduits and cables are clamped around the anchor cable by means of a plurality of cylindrical clamps 78 situated at spaced intervals along the length of the various conduits and cables as illustrated in FIG. 1, said clamps being secured by means of nut and bolt assemblies 79 in the usual way.

Various modifications can be made within the scope of the inventive concept which is herein disclosed and/or claimed.

What we claim as our invention is:

1. An assembly for cutting off trees and stumps under water comprising in combination with a surface vessel, an under water satelite component, flexible umbilical means connecting said component with said surface vessel, said surface vessel including a source of fluid pressure and an electrical source, said component including means operatively connected to said source of fluid pressure to control the attitude and position of said component within limits, relative to said surface vessel, and at least one saw blade journalled for rotation in a horizontal plane on one end of said component, a fluid operated motor on said component connected to said saw blade and being operatively connected to said source of fluid pressure.

2. The assembly according to claim 1 in which said means to control the attitude and position of said component relative to said surface vessel includes a plurality of fluid pressure operated motors on said satelite component, and a propeller operated by each of said motors, said motors including a first motor for forward and rearward movement of said component, a second motor for sideways movement of one end of said component, a third motor for sideways movement of the other end of said component, a fourth motor for vertical movement of said one end of said component, and a fifth motor for vertical movement of said other end of said component.

3. The assembly according to claim 1 which includes closed circuit television system operatively connected between said surface vessel and said component.

4. The assembly according to claim 2 which includes closed circuit television system operatively connected between said surface vessel and said component.

5. The assembly according to claim 2 in which said means to control the attitude and position of said component relative to said surface vessel also includes a pressure manifold and a return manifold on said component connected via said umbilical means, to said source of fluid pressure, a shuttle valve operatively connected between said manifolds and each of said motors, a slave piston and cylinder assembly on said component for each of said shuttle valves, a master piston and cylinder assembly on said surface vessel for each of said slave piston and cylinder assemblies, closed circuit fluid lines between each master cylinder and each slave cylinder, and manually operated means on said surface vessel to actuate each of said master pistons and hence each of said slave pistons, each of said slave pistons being operatively connected to each of said shuttle valves for actuating same whereby said motors may be stationary or rotated in a forward or reverse direction.

6. The assembly according to claim 3 in which said means to control the attitude and position of said component relative to said surface vessel also includes a pressure manifold and a return manifold on said component connected via said umbilical means, to said source of fluid pressure, a shuttle valve operatively connected between said manifolds and each of said motors, a slave piston and cylinder assembly on said component for each of said shuttle valves, a master piston and cylinder assembly on said surface vessel for each of said slave piston and cylinder assemblies, closed circuit fluid lines between each master cylinder and each slave cylinder, and manually operated means on said surface vessel to actuate each of said master pistons and hence each of said slave pistons, each of said slave pistons being operatively connected to each of said shuttle valves for actuating same whereby said motors may be stationary or rotated in a forward or reverse direction.

7. The assembly according to claim 4 in which said means to control the attitude and position of said component relative to said surface vessel also includes a pressure manifold and a return manifold on said component connected via said umbilical means, to said source of fluid pressure, a shuttle valve operatively connected between said manifolds and each of said motors, a slave piston and cylinder assembly on said component for each of said shuttle valves, a master piston and cylinder assembly on said surface vessel for each of said slave piston and cylinder assemblies, closed circuit fluid lines between each master cylinder and each slave cylinder, and manually operated means on said surface vessel to actuate each of said master pistons and hence each of said slave pistons, each of said slave pistons being operatively connected to each of said shuttle valves for actuating same whereby said motors may be stationary or rotated in a forward or reverse direction.

8. In an assembly for cutting off trees and stumps under water which includes a surface vessel, a source of fluid pressure on said surface vessel, an electrical source on said surface vessel, and flexible umbilical means extending from said surface vessel; an under water satelite component connected to said surface vessel by said flexible umbilical means, said component including means operatively connected to said source of fluid pressure to control the attitude and position of said component relative to said surface vessel, and at least one saw blade journalled for rotation in a horizontal plane on one end of said component, said saw blade being operatively connected to said source of fluid pressure.

9. The component according to claim 8 in which said means to control the attitude and position of said component relative to said surface vessel includes a plurality of fluid pressure operated motors on said satelite component, and a propeller operated by each of said motors, said motors including a first motor for forward and rearward movement of said component, a second motor for sideways movement of one end of said component, a third motor for sideways movement of the other end of said component, a fourth motor for vertical movement of said one end of said component, and a fifth motor for vertical movement of said other end of said component.

10. The component according to claim 8 which includes closed circuit television system operatively connected between said surface vessel and said component.

11. The component according to claim 9 which includes closed circuit television system operatively connected between said surface vessel and said component.

12. The component according to claim 9 in which said means to control the attitude and position of said component relative to said surface vessel also includes a pressure manifold and a return manifold on said component connected via said umbilical means, to said source of fluid pressure, a shuttle valve operatively connected between said manifolds and each of said motors, a slave piston and cylinder assembly on said component for each of said shuttle valves, a master piston and cylinder assembly on said surface vessel for each of said slave piston and cylinder assemblies, closed circuit fluid lines between each master cylinder and each slave cylinder, and manually operated means on said surface vessel to actuate each of said master pistons and hence each of said slave pistons, each of said slave pistons being operatively connected to each of said shuttle valves for actuating same whereby said motors may be stationary or rotated in a forward or reverse direction.

13. The component according to claim 10 in which said means to control the attitude and position of said component relative to said surface vessel also includes a pressure manifold and a return manifold on said component connected via said umbilical means, to said source of fluid pressure, a shuttle valve operatively connected between said manifolds and each of said motors, a slave piston and cylinder assembly on said component for each of said shuttle valves, a master piston and cylinder assembly on said surface vessel for each of said slave piston and cylinder assemblies, closed circuit fluid lines between each master cylinder and each slave cylinder, and manually operated means on said surface vessel to actuate each of said master pistons and hence each of said slave pistons, each of said slave pistons being operatively connected to each of said shuttle valves for actuating same whereby said motors may be stationary or rotated in a forward or reverse direction.

14. The component according to claim 11 in which said means to control the attitude and position of said component relative to said surface vessel also includes a pressure manifold and a return manifold on said component connected via said umbilical means, to said source of fluid pressure, a shuttle valve operatively connected between said manifolds and each of said motors, a slave piston and cylinder assembly on said component for each of said shuttle valves, a master piston and cylinder assembly on said surface vessel for each of said slave piston and cylinder assemblies, closed circuit fluid lines between each master cylinder and each slave cylinder, and manually operated means on said surface vessel to actuate each of said master pistons and hence each of said slave pistons, each of said slave pistons being operatively connected to each of said shuttle valves for actuating same whereby said motors may be stationary or rotated in a forward or reverse direction.

15. The assembly according to claim 1 which includes a pair of saw blades rotating in opposite directions in side by side relationship and in the same horizontal plane, the front portions of said saw blades rotating away from one another.

16. The assembly according to claim 8 which includes a pair of saw blades rotating in opposite directions in side by side relationship and in the same horizontal plane, the front portions of said saw blades rotating away from one another.

* * * * *